US 10,584,671 B2

(12) United States Patent
Tunzini et al.

(10) Patent No.: US 10,584,671 B2
(45) Date of Patent: Mar. 10, 2020

(54) BRUSHLESS STARTER GENERATOR

(71) Applicant: THALES, Courbevoie (FR)

(72) Inventors: Marc Tunzini, Chatou (FR); Eric Le Guerroue, Chatou (FR); Stanislas Bedjai, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/306,513

(22) PCT Filed: Jun. 6, 2017

(86) PCT No.: PCT/EP2017/063726
§ 371 (c)(1),
(2) Date: Nov. 30, 2018

(87) PCT Pub. No.: WO2017/211838
PCT Pub. Date: Dec. 14, 2017

(65) Prior Publication Data
US 2019/0331080 A1    Oct. 31, 2019

(30) Foreign Application Priority Data

Jun. 7, 2016  (FR) .................................... 16 00909

(51) Int. Cl.
*F02N 11/04*     (2006.01)
*H02K 7/18*      (2006.01)
(Continued)

(52) U.S. Cl.
CPC ........... *F02N 11/04* (2013.01); *H02K 7/1823* (2013.01); *H02K 7/20* (2013.01); *H02K 11/048* (2013.01); *H02K 2211/03* (2013.01)

(58) Field of Classification Search
USPC .............................. 290/2, 46; 322/10; 363/37
See application file for complete search history.

(56) References Cited

U.S. PATENT DOCUMENTS 5,055,700 A     10/1991  Dhyanchand
5,325,042 A *    6/1994  Murugan ................ F02N 11/04
                                                    322/10
(Continued)

FOREIGN PATENT DOCUMENTS

FR     2 348 594 A1    11/1977
FR     2 952 130 A1     5/2011

*Primary Examiner* — Pedro J Cuevas
(74) *Attorney, Agent, or Firm* — Baker & Hostetler LLP

(57) ABSTRACT

A brushless starter generator includes a main electric machine and an exciter comprising a stator, comprising a direct-current stator winding and an alternating-current stator winding, and a rotor comprising rotor windings; an alternator regulator that is intended to be connected to the direct-current stator winding via first and second direct-current electrical lines and intended to supply electrical power to the direct-current stator winding when the starter generator is operating in generator mode in order to generate a voltage at the output of the stator of the main electric machine and an SBU starter regulator supplying electrical power to the alternating-current stator winding and the stator windings of the main electric machine when the starter generator is operating in starter mode. The starter generator comprises an electrical connection device that is arranged and configured to establish an electrical connection between the two electrical lines. The alternating-current stator winding is provided with electrical power by means of the starter regulator.

17 Claims, 3 Drawing Sheets

(51) Int. Cl.
*H02K 7/20* (2006.01)
*H02K 11/04* (2016.01)

(56) References Cited

U.S. PATENT DOCUMENTS

| | | | | |
|---|---|---|---|---|
| 5,406,189 A * | 4/1995 | Wohlberg | ............ | H02M 1/4216 322/10 |
| 5,493,201 A * | 2/1996 | Baker | ................ | F02N 11/04 322/10 |
| 5,828,559 A * | 10/1998 | Chen | ................ | H02M 1/34 363/56.05 |
| 6,320,767 B1 * | 11/2001 | Shimoura | ............... | H02M 7/49 363/37 |
| 6,791,204 B2 * | 9/2004 | Sarlioqlu | ................ | F02C 7/268 290/47 |
| 6,998,726 B2 * | 2/2006 | Sarlioglu | ............ | F02N 11/0859 290/31 |
| 7,227,271 B2 * | 6/2007 | Anghel | ................ | F02N 11/04 290/31 |
| 7,696,642 B2 * | 4/2010 | Wakitani | ................ | H02J 1/10 307/65 |
| 7,847,434 B2 * | 12/2010 | Wakitani | ................ | H02J 9/062 307/65 |
| 8,026,679 B2 * | 9/2011 | Seo | ........................ | H02P 27/16 318/139 |
| 8,035,239 B2 * | 10/2011 | Horie | ................ | F01K 13/02 290/2 |
| 8,610,383 B2 * | 12/2013 | De Sousa | ............ | B60L 15/007 318/139 |
| 8,618,681 B2 * | 12/2013 | Yamamura | ............... | H02P 27/08 290/40 A |
| 8,638,003 B2 * | 1/2014 | Hashimoto | ............ | F02D 29/06 290/27 |
| 8,716,881 B2 * | 5/2014 | Nishikawa | ................ | H02P 9/02 290/44 |
| 8,766,603 B2 * | 7/2014 | Hashimoto | ................ | H02P 9/02 322/89 |
| 8,810,051 B2 * | 8/2014 | Yamamura | ............... | F02N 11/04 290/31 |
| 8,823,296 B2 * | 9/2014 | De Sousa | ............ | B60L 15/007 318/139 |
| 8,823,334 B2 * | 9/2014 | Huang | ................ | H02P 6/20 318/432 |
| 9,077,207 B2 * | 7/2015 | Hashimoto | ............... | H02J 3/40 |
| 9,086,044 B2 * | 7/2015 | Hashimoto | ............... | F02N 11/08 |
| 9,153,996 B2 * | 10/2015 | de Sousa | ............ | H02J 7/022 |
| 9,209,741 B2 * | 12/2015 | Gao | ................ | F02N 11/04 |
| 9,325,271 B2 * | 4/2016 | Hashimoto | ............... | H02P 9/02 |
| 9,685,800 B2 * | 6/2017 | Hatakeyama | ......... | B60L 3/0069 |
| 9,701,208 B2 * | 7/2017 | Berger | ................ | H02M 7/493 |
| 9,873,342 B2 * | 1/2018 | De Sousa | ............ | H02J 7/022 |
| 10,461,681 B2 * | 10/2019 | Irie | ................ | H02P 27/08 |
| 2004/0056487 A1 * | 3/2004 | Sarlioqlu | ................ | F02C 7/268 290/52 |
| 2004/0108726 A1 * | 6/2004 | Sarlioglu | ............ | F02N 11/0859 290/38 R |
| 2006/0061336 A1 * | 3/2006 | Anghel | ................ | F02N 11/04 322/59 |
| 2007/0296359 A1 * | 12/2007 | Seo | ........................ | H02P 27/16 318/139 |
| 2008/0197630 A1 * | 8/2008 | Wakitani | ................ | H02J 9/062 290/2 |
| 2008/0197709 A1 * | 8/2008 | Wakitani | ................ | H02J 1/10 307/84 |
| 2009/0206600 A1 * | 8/2009 | Horie | ................ | F01K 13/02 290/2 |
| 2011/0221363 A1 * | 9/2011 | De Sousa | ............ | B60L 15/007 318/139 |
| 2012/0019173 A1 * | 1/2012 | de Sousa | ................ | H02J 7/022 318/139 |
| 2012/0187879 A1 * | 7/2012 | Galea | ................ | H02M 7/5387 318/400.29 |
| 2012/0291739 A1 * | 11/2012 | Hashimoto | ............ | F02N 11/08 123/179.3 |
| 2012/0292902 A1 * | 11/2012 | Yamamura | ............... | F02N 11/04 290/31 |
| 2012/0292917 A1 * | 11/2012 | Nishikawa | ................ | H02P 9/02 290/1 A |
| 2012/0292920 A1 * | 11/2012 | Yamamura | ............... | H02P 27/08 290/40 B |
| 2012/0293004 A1 * | 11/2012 | Hashimoto | ............... | H02J 3/40 307/82 |
| 2012/0293140 A1 * | 11/2012 | Hashimoto | ............. | H02P 25/22 322/94 |
| 2012/0294049 A1 * | 11/2012 | Hashimoto | ............. | H02P 25/22 363/37 |
| 2012/0294050 A1 * | 11/2012 | Hashimoto | ............. | F02D 29/06 363/37 |
| 2013/0342135 A1 * | 12/2013 | De Sousa | ............ | B60L 15/007 318/139 |
| 2014/0117894 A1 * | 5/2014 | Huang | ................ | H02P 6/20 318/400.11 |
| 2014/0159481 A1 * | 6/2014 | Berger | ................ | H02M 7/493 307/10.1 |
| 2015/0244303 A1 * | 8/2015 | Gao | ................ | F02N 11/04 290/32 |
| 2015/0288201 A1 * | 10/2015 | Hatakeyama | ......... | B60L 3/0069 320/107 |
| 2015/0375629 A1 * | 12/2015 | De Sousa | ................ | H02J 7/022 318/139 |
| 2016/0322860 A1 * | 11/2016 | Wu | ........................ | H02J 9/06 |
| 2017/0047743 A1 * | 2/2017 | Toujinbara | ............... | H02J 3/385 |
| 2017/0133879 A1 * | 5/2017 | Eckhardt | ................ | G06Q 50/06 |
| 2018/0287460 A1 * | 10/2018 | Matsuhisa | ............ | H02K 7/1815 |
| 2019/0074791 A1 * | 3/2019 | Irie | ................ | H02M 7/5395 |
| 2019/0178923 A1 * | 6/2019 | Shao | ................ | G01R 31/024 |
| 2019/0214811 A1 * | 7/2019 | Nishimura | ............ | H02H 7/1216 |
| 2019/0238063 A1 * | 8/2019 | Irie | ........................ | H02M 1/12 |
| 2019/0242351 A1 * | 8/2019 | Matsuyama | ............ | H02P 27/06 |
| 2019/0280484 A1 * | 9/2019 | Shao | ................ | H02M 1/081 |
| 2019/0280615 A1 * | 9/2019 | Ng | ........................ | H02M 7/487 |
| 2019/0312540 A1 * | 10/2019 | Jain | ................ | H02P 27/047 |

* cited by examiner

BRUSHLESS STARTER GENERATOR

CROSS-REFERENCE TO RELATED APPLICATIONS

This application is a National Stage of International patent application PCT/EP2017/063726, filed on Jun. 6, 2017, which claims priority to foreign French patent application No. FR 1600909, filed on Jun. 7, 2016, the disclosures of which are incorporated by reference in their entirety.

FIELD OF THE INVENTION

The present invention relates to the starter generators of turbomachines.

BACKGROUND

The field of application of the invention is more particularly that of starter generators for gas turbine aeronautical propulsion engines mounted on aircraft. The invention may be applied, however, to other types of turbomachines, for example industrial turbines, helicopter turbines or auxiliary power unit (APU) turbines.

Such a starter generator comprises a rotary electric machine that is intended to be mechanically coupled to a shaft of a turbomachine. The starter generator is capable of operating in a generator mode, in what is termed a generation phase, during which the turbomachine rotates the shaft and the rotary machine transforms the mechanical energy of rotation of the shaft into electrical energy that is intended to supply a secondary network, for example an onboard network of an aircraft, with electrical power. The starter generator is also capable of operating in starter mode, during what is termed a startup phase, during which the rotary electric machine supplies mechanical power to the shaft of the turbomachine in order to set and to drive the shaft of the turbomachine in rotation so as to start up the turbomachine.

The rotary machine of such a starter generator, or S/G, typically comprises a main electric machine, an exciter and optionally an auxiliary generator. These elements of the rotary machine are mounted on a common shaft that is mechanically coupled to a shaft of the turbomachine. Such a starter generator is a brushless starter generator.

The main electric machine forms a main electric generator (or alternator) operating in synchronous mode. The main electric machine possesses a rotor winding and stator windings which, when it is operating in synchronous generator mode, convert mechanical energy supplied by a shaft that is mechanically coupled to the turbomachine into AC three-phase electrical energy supplying an onboard network of an aircraft with power via a power supply line. For aeronautical applications, the AC onboard network of aircraft, supplied with power via the voltage delivered by the starter generator operating in generator mode, consists of three phases with 115 V RMS from phase to neutral and 200 V RMS between phases. The frequency thereof may be fixed at 400 Hz or variable (generally between 350 and 800 Hz).

The exciter comprises a stator comprising two stator windings, one of which is supplied with DC current during the generation phase and the other of which is supplied with AC current during the startup phase. These respective windings are referred to as the DC stator winding and AC stator winding throughout the rest of the text. The AC voltage delivered by the main generator in the generation phase is regulated by means of an alternator regulator or GCU (generator control unit) which supplies the DC stator winding of the exciter with a DC current, referred to as the regulating current, during the generation phase and which does not supply it with current in the startup phase. The exciter then operates as a synchronous generator which delivers the electrical energy required by the rotor of the main electric machine while the main alternator (which is the main electric machine) is operating in generator mode.

The exciter comprises a rotor comprising rotor windings that are connected to the rotor winding of the main electric machine via a rotary rectifier so as to deliver, as output, a DC current for exciting the rotor winding of the main machine.

In order to limit the regulating current, the DC stator winding includes a large number of turns. For example, the startup stator winding includes 480 turns, or 4 ohms, which makes it possible to obtain 1152 ampere-turns of excitation with 2.4 A coming from the regulator. In the startup phase, when the shaft of the turbomachine is not rotating, if the DC stator winding of the exciter is being supplied with DC current, it cannot generate, in the rotor windings of the exciter, an AC current allowing the common shaft coupled to the shaft of the turbomachine to be set in rotation. Specifically, if the DC stator winding of the exciter is being supplied with DC current, there is no current in the rotor winding of the main electric machine and it is not possible to generate a torque for rotating the rotor of the main electric machine. The exciter cannot operate as a synchronous generator in the absence of rotation. It is necessary for the exciter to be supplied with AC electric current for the exciter to develop, across its rotor windings, an AC voltage which, after rectification, supplies the rotor winding of the main electric machine with power. During standstill, the exciter therefore behaves as a transformer having an air gap. If it is chosen to use the DC stator winding of the exciter in the startup phase, the impedance caused by the large number of turns and the high power supply frequency necessitates a supply voltage of 5500 volts in order to provide the 2900 ampere-turns of magnetizing induction. Since this level of voltage is generally not available on the aircraft, it is necessary for it to be generated by means of a voltage step-up converter, the cost and weight of which are prohibitive. It is for this reason that the AC stator winding is provided in the exciter. This winding is intended to be supplied with single-phase AC current during the startup phase so as to induce currents in the rotor of the exciter, which currents will be rectified in order to supply power to the rotor windings of the main electric machine which will then be able to deliver mechanical power allowing the turbomachine to start up.

Ideally, the DC and AC stator windings are in quadrature so as to limit the effect of mutual induction between these two windings and thus to avoid a voltage being induced across the terminals of the generator winding when the startup winding is being supplied with AC current. This quadrature arrangement is described in the French patent application published under the publication number FR 2 348 594.

However, the generation of a substantial voltage across the terminals of the generator winding, which amounts to 900 V in our example, is still observed in the startup phase. This high voltage is due to multiple factors including magnetic leakages and the recovery of the rotary diodes of the bridge rectifier. This voltage may result in damage to the alternator regulator GCU.

In order to avoid this overvoltage, a first solution consists in limiting the ratio of the number of turns between the DC and AC stator windings and in designing an alternator regulator that is capable of withstanding the voltage generated by this ratio in the startup phase. However, this solution has the drawback of decreasing the excitation gain, i.e. the ratio of the current injected into the exciter to the current sent to the rotor of the main electric machine.

A second solution consists in inserting a contactor allowing each of the two DC current lines connecting the DC stator winding to the first regulator to be opened and closed. One of these two lines connects one of the terminals of the DC stator winding to the regulator and the other line connects the other terminal of the DC stator winding to the regulator. This contactor is controlled so as to open each of the two lines in order to isolate the alternator regulator GCU of the rotary machine during the startup phase and to close each of these two lines during the generation phase. This contactor allows the regulator to be protected from over voltages. The main drawback is that this contactor is bulky and expensive since it must both withstand high voltages in the startup phase and large currents in the generation phase.

In both cases the number of turns is limiting since the voltage generated between the two lines in the generation phase may reach the insulating limits of the wires and other insulators. Not being able to increase the number of turns of the AC stator winding means that it is not possible to decrease the excitation current in the AC stator winding in the startup phase, thereby making it necessary to size the two electrical lines and the alternator regulator to withstand large currents.

SUMMARY OF THE INVENTION

One aim of the invention is to mitigate at least one of the aforementioned drawbacks.

To this end, the invention relates to a brushless starter generator that is intended to be mechanically coupled to a turbomachine, said starter generator being capable of operating in starter mode so as to rotate said shaft in order to start the turbomachine or in synchronous electric generator mode so as to transform mechanical energy delivered by the turbomachine into electrical energy, the starter generator comprising:
  a main electric machine having a stator comprising stator windings and a rotor comprising a wound rotor winding;
  a rotary rectifier;
  an exciter comprising a stator, comprising a direct-current stator winding and an alternating-current stator winding, and a rotor comprising rotor windings that are connected to the rotor winding of the main electric machine via the rotary rectifier, the rotors of the main electric machine and of the exciter being intended to be mechanically coupled to the turbomachine;
  an alternator regulator that is intended to be connected to the direct-current stator winding via the first and second direct-current electrical lines and intended to supply electrical power to the direct-current stator winding when the starter generator is operating in generator mode in order to generate a voltage at the output of the stator of the main electric machine;
  an SBU starter regulator that is intended to supply electrical power to the alternating-current stator winding and the stator windings of the main electric machine when the starter generator is operating in starter mode,
characterized in that it comprises an electrical connection device that is arranged and configured to establish an electrical connection between the two electrical lines when the starter generator is operating in starter mode.

Advantageously, the connection device comprises a connection element that is electrically connected both to the first electrical line and to the second electrical line and allows, when it is in a first, closed state, an electrical connection to be established between the first electrical line and the second electrical line and, when it is in a second, open state, this electrical connection between the first line and the second line to be removed;
  the connection device comprises a control means allowing the switching of the connection element between the first, closed state and the second, open state to be controlled, the control means being configured to place the connection element in the first, closed state when the starter generator is operating in starter mode and to place the connection element in the second, open state when the starter generator is operating in generator mode.

In a second embodiment, the connection device comprises a connection element comprising an ohmic conductor that is electrically connected both to the first electrical line and to the second electrical line.

Advantageously, the electrical resistance of the ohmic conductor is higher than that of the direct-current stator winding.

Advantageously, the connection device comprises a connection element that is connected both to the first electrical line and to the second electrical line, and wherein the connection element is attached to the alternator regulator.

Advantageously, the starter generator comprises a rotary machine comprising the main machine, the exciter and a casing enclosing the main machine and the exciter. The starter generator further comprises a regulator assembly comprising the alternator regulator and the connection element, the regulator assembly and the rotary machine forming two objects that are electrically connected or intended to be electrically connected to one another.

Advantageously, the alternator regulator comprises a first regulator allowing the supply current and/or voltage of the direct-current stator winding to be regulated, the first regulator comprising power components that are electrically connected to one another by conductive tracks that are formed on a printed circuit board, the connection element being added to the printed circuit board.

Advantageously, the connection device comprises a connection element that is connected both to the first electrical line and to the second electrical line, and wherein the alternator regulator comprises a first support and a first regulator that is supplied with direct current and allows the supply current and/or voltage of the direct-current stator winding to be regulated, wherein the first support is a housing accommodating the first regulator and the connection element.

Advantageously, the starter regulator comprises a single-phase inverter and a three-phase inverter that are attached to the alternator regulator.

Advantageously, the starter generator comprises a casing accommodating the main electric machine and the exciter and the connection element is attached to the casing.

Advantageously, the connection element is accommodated in the casing.

Advantageously, the starter generator comprises a transformer assembly comprising the rotary machine and the connection element, the transformer assembly and the alternator regulator forming two objects that are electrically connected or intended to be electrically connected to one another.

As a variant, the alternator regulator is attached to the casing for example via the printed circuit board or the housing.

Advantageously, the direct-current stator winding and the alternating-current stator winding are mounted substantially in phase quadrature so as to limit the voltage induced in the direct-current stator winding when the starter generator is operating in starter mode.

BRIEF DESCRIPTION OF THE DRAWINGS

Other features and advantages of the invention will become apparent on reading the detailed description that follows, given by way of nonlimiting example and with reference to the appended drawings, in which.

From one figure to another, the same elements bear the same references.

DETAILED DESCRIPTION

Figure 1:
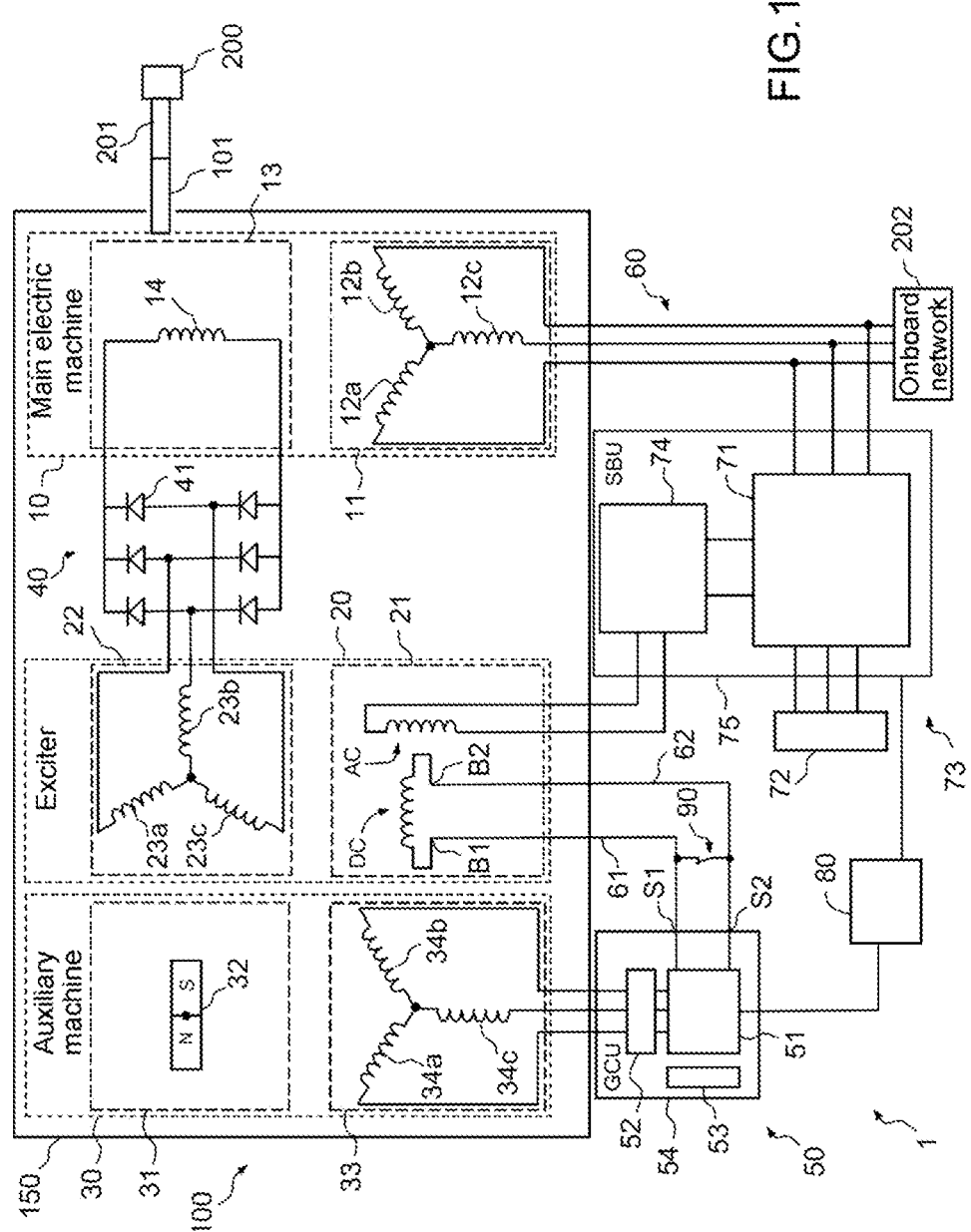
FIG. 1 schematically represents a starter generator according to a first embodiment of the invention.

FIG. 1 schematically represents a wound rotor excitation brushless starter generator 1 according to the invention. This starter generator comprises a rotary electric machine 100. The rotary machine is intended to be mechanically coupled to a shaft 201 of a turbomachine 200. The starter generator is capable of operating in generator mode, in what is termed a generation phase, during which the turbomachine supplies motive power to the rotary electric machine 100. In this phase the rotary machine 100 transforms the mechanical energy of rotation of the shaft into electrical energy that is intended to supply a secondary electrical network, for example an onboard network of an aircraft, with power. The starter generator is also capable of operating in starter mode, during a startup phase, during which it drives the shaft of the turbomachine in rotation so as to start up the turbomachine.

The rotary machine comprises three sub-machines: a main electric machine 10, an exciter 20, optionally an auxiliary generator 30, and a rotary bridge rectifier 40. The rotary machine comprises a casing 150 accommodating the main electric machine, the exciter and the optional auxiliary generator. The stator of the rotary machine is attached to the casing 150.

Figure 3:
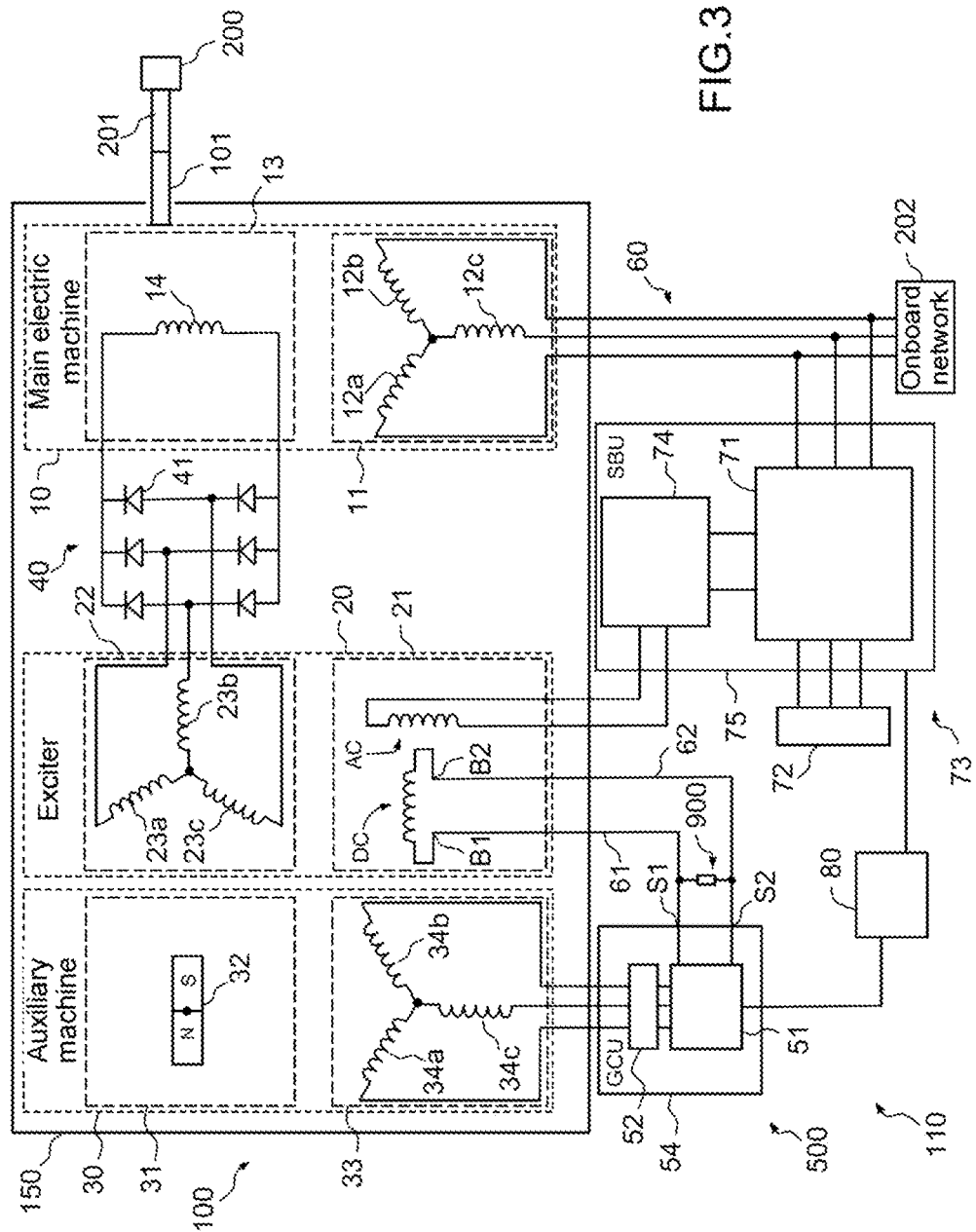
FIG. 3 schematically represents a starter generator according to a first embodiment of the invention.

The rotors of the main electric machine 10, of the exciter 20 and of the auxiliary generator 30 form the rotor of the electric machine 100. They are mounted on a common shaft 101, of which only the portion outside the casing 150 is shown in FIGS. 1 and 3. The common shaft 101 is intended to be mechanically coupled to a shaft 201 of a turbomachine 200. The turbomachine is for example a propulsion engine of an aircraft. The casing 150 is intended to be mounted on a support of the equipment comprising the turbomachine, for example an aircraft support. In starter mode, the rotary electric machine 100 rotates the common shaft 101. The common shaft 101 rotates with respect to the casing 150.

The starter generator comprises elements for accelerating the rotor 13 of the main electric machine 10 that are mechanically coupled to the turbomachine 200 so as to start up the turbomachine without the use of an auxiliary starter device. When the starter generator 1 is operating in starter mode, the main electric machine 10 constitutes a synchronous electric motor which provides the torque required for rotating the turbomachine 200. When the starter generator is operating in starter mode, the exciter 20 is supplied with AC current so as to start up the turbomachine. Once the speed of rotation of the shaft of the turbomachine has reached a first threshold, this power supply is interrupted since the torque produced by the turbomachine is sufficient for the turbomachine to sustain the motion of the shaft 201 by itself. The starter generator then ceases to operate in starter mode. The speed of rotation of the shaft of the turbomachine accelerates by itself, that is to say autonomously, until it reaches a second threshold, which is higher than the first threshold, beyond which the starter generator will be able to operate in generator mode. The generator and starter modes are not simultaneous.

The main electric machine 10 comprises a stator 11 comprising polyphase AC stator windings 12a, 12b, 12c, which may be connected in star configuration, and a rotor 13 comprising a rotor winding 14.

In generator mode, once the turbomachine has been started up, the main electric machine 10 constitutes a synchronous electric generator which transforms the mechanical energy of rotation of the common shaft 101 that is mechanically coupled to the turbomachine shaft 201 into a voltage U that is delivered as output from its stator 11 to a power supply line 60 which routes the voltage U to a device that is intended to be supplied with electrical power, for example the onboard network 202 of the aircraft. This voltage U is a three-phase voltage.

The exciter 20 comprises a stator 21 comprising a direct-current DC stator winding or direct-current DC wound stator inductor and an alternating-current AC stator winding or alternating-current AC wound stator inductor and a rotor 22 comprising rotor windings 23a, 23b, 23c, which may be connected in star configuration. The AC currents on the rotor 22 of the exciter 20 are rectified by a rotary rectifier 40, such as a rotary diode bridge 41, in order to supply the rotor winding 14 of the main electric machine 10 with DC current.

The auxiliary generator 30 is for example a synchronous generator comprising a rotor 31 comprising permanent magnets 32 and a stator 33 comprising stator windings 34a, 34b, 34c.

The stators of the optional auxiliary generator, of the exciter and of the main machine form the stator of the rotary machine. It is fixed with respect to the casing 150.

The aforementioned rotors and stators each comprise a structure to which the windings of the corresponding rotor or stator are attached.

The starter generator 1 further comprises an alternator regulator 50 or GCU (generator control unit).

The alternator regulator 50, or GCU, supplies electrical power to the direct current DC stator winding when the starter generator is operating in generator mode. This power supply is configured so as to generate a nonzero voltage U as the output from the stator of the main electric generator 10 to the line 60.

The GCU 50 does not supply power to the direct-current DC stator winding when the starter generator is operating in starter mode. In other words, the GCU 50 is capable of being either in a first state in which it supplies power to the direct-current DC stator winding or in a second state in which it does not supply power to this stator winding.

The alternator regulator 50, or GCU, comprises a first regulator 51 that is supplied with direct current and allows the supply current and/or voltage of the direct-current DC stator winding to be regulated. This first regulator is supplied with electrical power by means of a three-phase voltage from the stator 33 of the auxiliary generator 30. The alternator regulator 50 rectifies (by means of a rectifier 52) and regulates (by means of the first regulator 51) the DC voltage delivered to the terminals of the direct-current DC stator winding. The first regulator comprises controllable power components, forming a chopper, which are supplied with direct current and intended to supply electrical power to the DC winding. These power components (or this chopper) can be controlled so as to provide current and/or voltage regulation. The first regulator comprises a chopper control means for controlling the chopper. Information representing the value of the voltage and/or the current at a reference point on the power supply line 60 is delivered to the chopper control means.

As a variant, the rotary electric machine has two stages. It has no auxiliary generator and the first regulator 51 is for example supplied with electrical power by means of the onboard network 202 of the aircraft during the generation phase. The alternator regulator 50 does not necessarily comprise the rectifier 52. Specifically, it may be supplied with direct current.

The starter generator comprises two power supply lines 61, 62.

Advantageously, the lines connect the first regulator to the direct-current DC stator winding. As a variant, the starter generator according to the invention may be sold without the two lines connecting the first regulator to the stator winding, the first regulator and the stator winding subsequently being connected via the two lines 61, 62 by wiring after mounting on one or more supports of the equipment, for example an aircraft, comprising the turbomachine.

The alternator regulator 50 is electrically connected, via the first regulator, to the direct-current DC stator winding via the two DC electrical lines 61, 62. The two electrical lines 61, 62 connect the two terminals B1, B2 of the direct-current DC stator winding to the respective two output terminals S1, S2 of the alternator regulator 50, and in particular of the first regulator 51. In other words, the alternator regulator 50 allows the direct-current DC stator winding to be supplied with electrical power via the two electrical lines 61, 62, i.e. a voltage to be applied between the two terminals B1, B2 of the DC winding. These electrical lines 61, 62 are electrical wires.

The alternating current AC stator winding is arranged so as to induce, when it is being supplied with alternating current, an alternating current in the rotor winding 14 of the main exciter 10.

The starter generator 1 comprises a starter regulator, referred to as an SBU (start box unit), 73 that is electrically connected or intended to be electrically connected to the alternating-current AC stator winding and to the stator windings 12a, 12b, 12c. The starter regulator 73 supplies the alternating-current AC stator winding with single-phase alternating current and the stator windings 12a, 12b, 12c via a polyphase, here three-phase, power supply line when the starter generator is operating in starter mode. This allows currents to be induced in the rotor of the exciter for the purpose of supplying power to the rotor windings of the main machine, the stator windings of which are supplied with power in order to start up the turbomachine.

The starter regulator SBU 73 regulates the supply current and/or voltage of the alternating-current AC stator winding and of the stator windings of the main machine 12a,12b, 12c when the starter generator is operating in starter mode.

The SBU may be electrically connected to the AC winding and to the stator windings 12a, 12b, 12c before or after mounting on the equipment such as the aircraft.

The starter regulator SBU 73 supplies the stator windings 12a, 12b, 12c with variable-frequency polyphase alternating current by means of a three-phase inverter 71 when the starter generator is operating in starter mode.

The single-phase inverter is advantageously a pulsewidth-modulation (PWM) inverter so as to generate variable-frequency sinusoidal currents. These power supplies are designed to allow the turbomachine to be started up. The starter regulator, or SBU, 73 does not supply power to the AC winding and to the stator windings when the starter generator is operating in generator mode. In other words, the starter regulator, or SBU, 73 is capable of being either in a first state in which it supplies power to the AC winding or in a second state in which it does not supply power to this AC winding. In the first state the starter regulator 73 supplies power to the stator windings 12a, 12b, 12c and in the second state it does not supply power to the stator windings 12a, 12b, 12c.

The variable-frequency converter, or three-phase inverter, 71 is supplied with electrical power by means of another generator 72. The other generator 72 may be the onboard network, a battery on board the aircraft or a ground generator set. A position sensor (not shown) transmits information on the position of the shaft 101 to the variable-frequency converter 71 so that the latter feedback-controls the current that it delivers according to the position of the shaft 101 such that the main electric machine operates in BLDC synchronous mode. In other words, the supply of power to the stator of the main electric machine depends on the position of the rotor.

The starter regulator 73 also comprises a single-phase inverter 74 which generates the electrical power to be supplied to the exciter 20 for starting up the turbomachine. The single-phase inverter 74 advantageously comprises power components and a control means for the power components in order to control in particular the voltage delivered by the single-phase inverter and optionally the frequency thereof. The single-phase inverter is, for example, supplied with voltage by a rectifier stage of the variable-frequency converter 71. As a variant, the inverter is supplied with voltage from an onboard network of the aircraft or a ground generator set.

A general control means 80 controls the GCU, in particular the first regulator 51 and the SBU, in order to set the starter generator in generator mode or in starter mode. It allows the GCU to be switched from the first state to the second state according to the desired mode. It also allows the SBU to be switched from the first state to the second state according to the desired mode. The general control means 80 may be comprised within the starter generator or outside the starter generator.

Advantageously, as explained in the French patent application published under the number FR 2 348 594, the direct-current DC stator winding and the alternating-current AC stator winding are mounted substantially in phase quadrature so as to limit the voltage induced in the direct-current DC stator winding during the startup phase. In other words, this configuration limits the effect of mutual induction between the two windings. This makes it possible to limit the risk of damaging the DC excitation circuit (first regulator).

Figure 2:
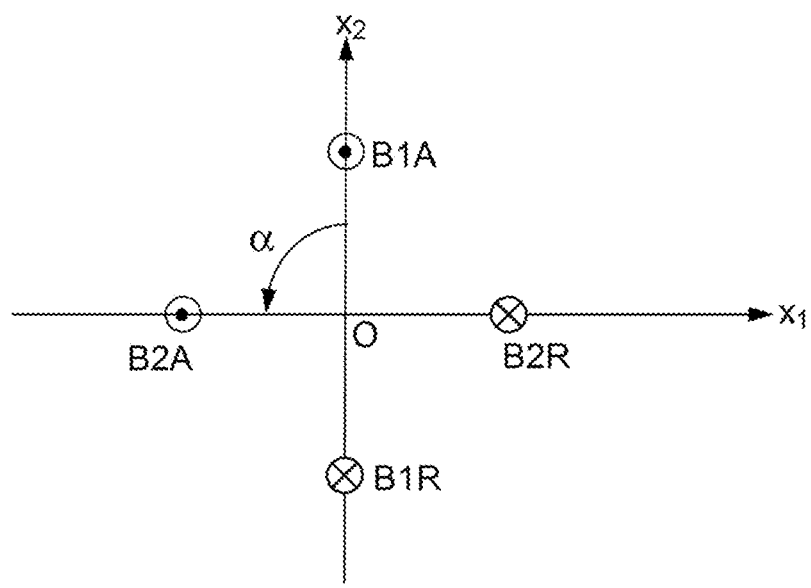
FIG. 2 schematically represents a preferred arrangement of the DC and AC stator windings.

FIG. 2 schematically shows a quadrature configuration in order to explain this configuration.

The direct-current DC stator winding comprises at least one first coil B1A, B1R comprising an outward portion B1A and a return portion B1R and the alternating-current AC stator winding comprises at least one second coil B2A, B2R comprising an outward portion B2A and a return portion B2R. Each second coil B2A, B2R is arranged so as to induce an alternating current in the rotor winding 23a, 23b, 23c of the exciter when said coil is supplied with voltage. Advantageously, the two stator windings comprise a plurality of first coils and a plurality of second coils.

In general, each second coil B2A, B2R comprises a magnetic axis x2 that is spatially located substantially in phase quadrature association with respect to the magnetic axis x1 of each coil B1A, B1R that is adjacent thereto. Consequently, if a magnetic flux is generated by a first coil, it theoretically does not generate a magnetic flux in the adjacent second coil in an ideal system. In other words, in the startup phase, the AC current field that is generated by the AC power supply of the alternating-current AC stator winding theoretically does not induce a voltage in the direct-current DC stator winding which is not supplied with direct current by the first regulator 51. This configuration limits the effect of mutual induction between the two windings. This makes it possible to limit the risk of damaging the DC excitation circuit (first regulator).

The magnetic axes of the first and second coils are arranged radially with respect to an axis (here an axis that is perpendicular to the plane of FIG. 2 passing through the point O), and are arranged in one and the same plane that is substantially perpendicular to this axis (here the plane of the sheet).

In the example of FIG. 2, the AC and DC windings each comprise a coil and the electrical angle formed between the first coil and the second coil is Π/2.

The mechanical angle α, expressed in radians, that is formed between the adjacent coils of the two windings, in a plane that is perpendicular to the axis of rotation, is given by the following formula:

$$\alpha = \frac{\pi}{2} * \frac{1}{N}$$

where N is the number of pairs of poles of the exciter.
N is equal to 1 in the example shown in FIG. 2.

The rotor may be a salient-pole rotor as described in the patent application FR 2 348 594 or a non-salient-pole rotor.

Even when the two AC and DC wound stator windings are arranged in quadrature association, an uncomprehending voltage across the terminals of the direct-current DC stator winding is generated in the startup phase, which may result in damage to the alternator regulator. The fluxes and the voltages generated in the DC stator winding in the startup phase are not cancelled out but only minimized.

According to the invention, the starter generator 1 comprises an electrical connection device 53, 90 that is arranged and configured to establish an electrical connection between the two DC electrical lines 61, 62 when the starter generator according to the invention is operating in starter mode. In other words, the electrical connection device 53, 90 is arranged and configured to establish the electrical connection between the two electrical lines 61, 62 when the starter regulator 73 is supplying the alternating-current AC rotor winding with alternating current. The electrical connection between the electrical lines 61, 62 is established between the direct-current DC stator winding and the alternator regulator and in particular the first regulator 51. The electrical connection is made by means of a connection element that is connected to the two electrical lines 61, 62 and connected in parallel with the DC winding.

The electrical connection device 53, 90 makes it possible to partially or completely short the two DC electrical lines 61, 62 electrically connecting the alternator regulator to the respective two terminals B1 and B2 of the direct-current DC stator winding between which the alternator regulator, or GCU, 50 is intended to supply power to the DC winding. This connection device 53, 90 is connected in parallel with the direct-current DC stator winding, between the DC winding and the first regulator 51. The establishment of the electrical connection during the startup phase generates a circulating current (or short-circuit current between the two lines 61, 62) which makes it possible to limit the level of voltage that is generated, by the alternating-current AC stator winding, via the DC winding, at the output terminals S1, S2 of the alternator regulator, or GCU, 50 in the startup phase. The connection device 53, 90 according to the invention allows the alternator regulator, or GCU, 50, and in particular the first regulator 51, to be protected from over voltages. Thus, the power dissipated in the alternator regulator, or GCU, 50 and in the direct-current DC stator winding is decreased. In other words, the device according to the invention limits the effect of the leakage flux arising from the alternating-current AC stator winding. It allows, when the starter generator 1 is operating in starter mode, the alternator regulator, or GCU, 50, between its two output terminals 51, S2, to be subjected to a voltage that is lower than the voltage to which it would be subjected if the generator were without the connection device. This makes it possible to avoid decreasing the ratio of the number of turns between the rotor and the stator of the exciter, which makes it possible to retain a high gain, and this makes it possible to avoid oversizing the power supply lines 61, 62 and the alternator regulator, or GCU, 50, since the currents conveyed by the power supply lines remain small.

The connection device is advantageously chosen so that the voltage applied to the output terminals 51, S2 of the alternator regulator, or GCU, 50 is lower than a maximum voltage corresponding to the maximum voltage that the alternator regulator, or GCU, 50 is able to withstand without suffering damage, during the startup phase, at least while the alternating-current AC stator winding is being supplied with alternating current by the second regulator.

In the example shown in FIG. 1, the connection element 90 is electrically connected both to a first line 61 and to a second line 62. It is connected in parallel with the DC winding. The connection element 90 is connected to the lines 61 and 62 between the direct-current DC stator winding and the first regulator 51. In the example shown, the connection element 90 is arranged between the alternator regulator, or GCU, 50 and the DC winding. The connection element 90 may also advantageously be included within the regulator, or GCU, 50, as will be seen below.

The connection element 90 allows, when it is in a first, closed state, an electrical connection to be established between the first line 61 and the second line 62 and allows, when it is in a second, open state, this electrical connection to be removed, i.e. the two lines 61 and 62 to be electrically separated.

The starter generator further comprises a control means 53 allowing the transition (or switch) of the connection element 90 from the first, closed state to the second, open state, and vice versa, to be controlled. The control means 53 is configured to place the connection element in the first, closed state when the starter generator is operating in starter mode and, more specifically, when the alternating-current AC stator winding is being supplied with alternating current by the starter regulator 73. Preferably, the control means is configured so as to place the connection element in the first, closed state over the entire duration over which the alternating-current AC stator winding is being supplied with alternating current by the starter regulator 73. The control means 53 is advantageously configured to place the connection element 90 in the second, open state when the starter generator 1 is operating in generator mode, preferably over the entire duration over which the starter generator 1 is operating in generator mode. This connection device allows the voltage delivered as output from the first regulator in the startup phase to be dramatically limited because, when the connection element is in the closed state, the two lines 61, 62 are almost completely or completely shorted, and dissipates little or no power in generator mode. Furthermore, by establishing the electrical connection between the two lines 61 and 62 over the entire duration over which the AC winding is being supplied with alternating current, for example over the entire duration of the startup phase, this solution is straightforward to implement. This is also the case of the second embodiment which will be described below.

The control means 53 may be configured to switch the connection element 90 from the first, closed state to the second, open state at the moment when the GCU switches from the second state to the first state, i.e. during the transition from startup mode to generation mode.

As a variant, the control means 53 is configured to switch the element 90 from the second, open state to the first, closed state at the moment when the SBU switches from the second state to the first state.

In the embodiment of FIG. 1, the control means 53 is comprised within the GCU. It may be a dedicated control means (as shown in FIG. 1) or be the chopper control means. As a variant, the control means 53 is external to the GCU.

When the starter generator is operating in generator mode, only the direct-current DC stator winding is supplied with electrical power and the connection element 90 is in the open position. It must then withstand a voltage of 11 volts in the aforementioned numerical example. When the starter generator is operating in starter motor, the connection element 90 is in the closed state and the circulating current is then 2 A in our numerical example. This current is entirely acceptable from a heating perspective since it is lower than the nominal supply current in generator mode, which is 2.4 A. However this is not essential as long as the current is compatible with the electrical wires and the connection element. The gauge of the connection element may be small since it is sized for a lower voltage and advantageously for a smaller current.

In the embodiment of FIG. 1, the connection element 90 is a contactor. In general, the connection element is a switch. It is a mechanical or electromechanical switch. It may be a contactor or an electromechanical relay, for example. As a variant, the switch is an electronic switch. It is a transistor, for example.

FIG. 3 shows a starter generator 110 according to a second embodiment, which differs from the starter generator according to the first embodiment shown in FIG. 1 in that the connection device is different. In the second embodiment, the electrical connection device comprises a connection element that takes the form of an ohmic conductor 900 that is electrically connected both to the first DC line 61 and to the second DC line 62 between the direct-current DC stator winding and the GCU 500 or first regulator 51. In other words, the ohmic conductor 900 is connected in parallel with the direct-current DC stator winding. It is connected in parallel with the DC winding between the DC winding and the first regulator 51. In the embodiment of FIG. 3, it is connected between the GCU 500 and the DC winding. The element 900 may be advantageously included within the regulator, or GCU, 500. This embodiment has the advantage of not requiring control means in order to provide the electrical connection function between the two lines 61, 62 in starter mode while allowing a difference in potential to be applied between the terminals of the DC generator stator winding in generator mode so as to generate the desired voltage on the stator of the main electric machine. This connection device does not comprise any control means. It is therefore reliable. It additionally has the advantage of being less expensive than a connection device comprising a contactor. However, power is dissipated by the ohmic conductor in generator mode. The GCU must therefore deliver additional power in generator mode for the main electric machine 10 to deliver the desired voltage at the output of its stator.

In the example shown, the ohmic conductor 900 is formed of a single individual ohmic conductor. As a variant, the ohmic conductor comprises a plurality of individual ohmic conductors that are connected in parallel or in series.

If, in the aforementioned numerical example, the resistance value of the ohmic conductor 900 is 20 ohms, then, when the starter generator 1 is operating in generator mode, the ohmic conductor 900 is subjected to a voltage of 11 V and must dissipate 6 W which is a problem neither for an ohmic conductor 900 nor for the first regulator 51, which must deliver 23% additional power for a current of 2.4 A and a resistance of the DC excitation winding of 4.5 ohms. When the starter generator 1 is operating in starter mode, the current that is generated by the AC starter stator winding in the resistor 900 is then 0.8 A. The power dissipated by the ohmic conductor is then 12 W and the voltage seen across the terminals of the first regulator 51 is then 16 V, which is entirely bearable without oversizing the regulator.

Preferably, the electrical resistance of the ohmic conductor is higher than that of the direct-current DC stator winding. This makes it possible to limit the electrical power dissipation in the resistor in generator mode and the consequent increase in the power that has to be delivered by the GCU 50 in generator mode. Furthermore, this allows the GCU 50 protection function to be ensured by resulting in a sufficient decrease in the voltage across the terminals of the first stator winding in startup phase. However, it is entirely possible to envisage an embodiment in which the electrical resistance of the ohmic conductor is lower than or equal to that of the direct-current DC stator winding in a case in which limiting overvoltages across the terminals of the GCU, in particular across the terminals of the first regulator 51, takes priority over limiting the dissipation of electrical power.

In the nonlimiting embodiments of FIGS. 1 and 3, the alternator regulator, or GCU, 50 comprises a first housing 54. The first regulator 51 and the optional rectifier 52 are accommodated in the housing 54. The first regulator 51, the optional rectifier and the first support 54 form a circuit board comprising the substrate, the conductive tracks of the printed circuit board and the power components comprised in the first regulator and the optional rectifier. As a variant, the support 54 is a housing accommodating the aforementioned elements. The housing provides the function of supporting and protecting the aforementioned elements. In the embodiment of the figures, the GCU is located outside the casing 150.

In the embodiment of FIGS. 1 and 3, the GCU and the rotary machine form two objects, or independent assemblies, which are electrically connected or intended to be electrically connected to one another. In other words, they are intended to be mounted separately on a support or separate respective supports of the equipment comprising the turbomachine, for example an aircraft. They may be mounted on different supports of the equipment which are not necessarily fixed with respect to one another.

In the embodiment of FIGS. 1 and 3, the connection element 90, 900 is arranged outside the housing 54. The casing 150, the GCU and the connection element are movable with respect to one another before attachment to one or more supports of the equipment comprising the turbomachine. In other words, they form objects, i.e. two independent assemblies, that are intended to be electrically connected or electrically connected to one another. They are therefore intended to be mounted in two separate steps on one or more supports of the equipment accommodating the turbomachine. They may be attached to separate respective supports of the equipment or aircraft.

Advantageously, the connection element 90 or 900 is attached to the GCU (before mounting on the equipment). In other words, the GCU is provided with the connection element. In this way, the connection element and the GCU are intended to be attached to a support of the equipment comprising the turbomachine in one and the same mounting step. The GCU and the connection element may also be electrically connected to the DC winding in one and the same wiring step. The connection element is for example attached to the support of the equipment via the GCU. This makes it possible to facilitate the mounting and the maintenance of this assembly.

A regulator assembly comprises the alternator regulator and the connection element. Advantageously, the regulator assembly and the rotary machine form two objects, i.e. two independent assemblies, which are electrically connected or intended to be electrically connected to one another. These objects are intended to be mounted separately on a support or a plurality of supports of the equipment comprising the turbomachine. It is thus possible to mount the casing and the regulator assembly at two separate sites on the equipment comprising the turbomachine. This allows the electrical connection between these elements to be made more reliable by making it possible to escape from the restrictive environment of the area in which the rotary machine 100 is placed. Advantageously, the casing and the regulator assembly, once mounted on the equipment, are attached to one another via one or more supports of the equipment.

Advantageously, the connection element 90, 900 is arranged or accommodated inside the housing 54. This makes it possible to avoid installing wires between the GCU and the connection element 90, 900, facilitates the mounting of the device and allows the connection element to be protected in a compact manner. As a variant, the connection element is arranged outside the housing.

Advantageously, for the same reasons, the control means 53 is attached to the GCU. It then forms part of the regulator assembly. It is advantageously accommodated inside the housing 54. The control means could be arranged outside the housing 54.

Even more advantageously, the first regulator 51 is formed of power components that are electrically connected by conductive tracks formed on a printed circuit board, the connection element 90, 900 being added to the printed circuit board. Preferably, the connection element is added to the printed circuit board. It is advantageously electrically connected to the first regulator 51 by means of tracks of the printed circuit board. This allows the electrical connections between the first regulator 51 and the connection element to be made more reliable.

In the example of FIG. 3, the SBU forms an object that is separate from the GCU and from the rotary machine and that is electrically connected or intended to be electrically connected to the rotary machine. It is accommodated in another support 75 that is separate from the casing 150 and from the support 54. In one particular embodiment, the single-phase inverter 74 and/or the three-phase inverter 71 are attached to the GCU. More specifically, the GCU is provided with the connection element. In this way, the single-phase inverter 74 and/or the three-phase inverter 71 that are attached to the GCU form part of the regulator assembly. The single-phase inverter 74 and/or the three-phase inverter 71 are for example accommodated in the housing.

In one particular embodiment, the single-phase inverter and/or the three-phase inverter are formed of power components that are added to the printed circuit board. They are electrically connected by conductive tracks that are formed on the same printed circuit board as the first regulator.

In the embodiment of FIG. 3, the GCU is located outside the casing 150. The GCU and the DC winding are therefore connected or intended to be connected by means of the two lines 61 and 62 which extend between the two supports 54 and 150, i.e. which connect the two supports 54, 150.

Advantageously, the connection element 90 or 900 is attached to the casing 150. More specifically, the rotary machine is provided with the connection element 90 or 900 which is attached to the casing 150. In this way, the connection element and the rotary machine are intended to be mounted on a support of the equipment comprising the turbomachine in one and the same mounting step. The connection element is attached to the support of the equipment via the casing 150. The DC winding and the connection element may also be electrically connected to the GCU in one and the same wiring step. This also facilitates the mounting of the the starter generator on the aircraft. The connection element may be attached to the outside of the casing, which facilitates the maintenance of the connection element. As a variant, the connection element is accommodated in the casing 150.

The starter generator comprises a transformer assembly comprising the rotary machine and the connection element that is attached to the casing. Advantageously, the transformer assembly and the alternator regulator form two objects that are electrically connected or intended to be electrically connected to one another. They are intended to be mounted separately on a support or separate respective supports of the equipment comprising the turbomachine.

As a variant, the GCU may be attached to the casing 150. In this way, these elements may be mounted on a support of the equipment comprising the turbomachine in one and the same mounting step. The GCU is then attached to the support of the equipment via the casing 150. The GCU may be positioned inside or outside the casing.

Advantageously, when the connection element is attached to the GCU, the connection element is attached to the casing via the GCU. The connection element, rotary machine and GCU assembly forms a block that may be added to the equipment in one and the same mounting step. This therefore facilitates the mounting of the starter generator on the equipment.

For example, the connection element is added to the printed circuit board of the GCU and is attached to the casing via said printed circuit board of the GCU. In other words, the printed circuit board or the substrate of the printed circuit board is added to the casing. As a variant, when the connection element is accommodated in the housing of the GCU, the connection element may be attached to the casing via the housing.

The description of the possible ways of arranging the connection element with respect to the casing and to the GCU is also applicable for the control means 53. The control means 53 may for example form part of the regulator or transformer assembly.

The invention also relates to an assembly comprising equipment accommodating the turbomachine and comprising a starter generator that is mounted on a support of the equipment and of which the rotor of the main machine is coupled to the turbomachine.

The alternator regulator, or GCU, 50 and the starter generator SBU 71 conventionally comprise power components, such as for example MOS or IGB transistors, and optionally a control means for controlling the power elements or for controlling the contactor. As a variant, these control means may be external to the GCU and/or to the SBU. These control means may comprise one or more dedicated electronic circuits or a general-purpose circuit. Each electronic circuit may comprise a reprogrammable computing machine (a processor or a microcontroller for example) and/or a computer executing a program comprising a sequence of instructions and/or a dedicated computing machine (for example a set of logic gates such as an FPGA, a DSP or an ASIC, or any other hardware module). The alternator regulator and the starter regulator may also comprise at least one power supply for supplying the control means.

The general control means or general driver may comprise a reprogrammable computing machine (a processor or a microcontroller for example) and/or at least one computer executing a program comprising a sequence of instructions and/or a dedicated computing machine (for example a set of logic gates such as an FPGA, a DSP or an ASIC, or any other hardware module).

The invention claimed is:

1. A brushless starter generator, said starter generator being capable of operating in starter mode so as to rotate said shaft in order to start a turbomachine or in synchronous electric generator mode so as to transform mechanical energy delivered by the turbomachine into electrical energy, the starter generator comprising:
    a main electric machine having a stator comprising stator windings and a rotor comprising a rotor winding and intended to be coupled to the turbomachine;
    a rotary rectifier;
    an exciter comprising a stator, comprising a direct-current stator winding and an alternating-current stator winding, and a rotor comprising rotor windings that are connected to the rotor winding of the main electric machine via the rotary rectifier, the rotors of the main electric machine and of the exciter being intended to be mechanically coupled to the turbomachine;
    an alternator regulator that is intended to be connected to the direct-current stator winding via the first and second direct-current electrical lines and intended to supply electrical power to the direct-current stator winding when the starter generator is operating in generator mode in order to generate a voltage at the output of the stator of the main electric machine;
    an SBU starter regulator that is intended to supply electrical power to the alternating-current stator winding and the stator windings of the main electric machine when the starter generator is operating in starter mode,
    wherein it comprises an electrical connection device that is arranged and configured to establish an electrical connection between the two electrical lines when the starter generator is operating in starter mode.

2. The starter generator as claimed in claim 1, wherein the electrical connection device is configured to establish an electrical connection between the two electrical lines over the entire duration over which the alternating-current AC stator winding is being supplied with alternating current by the starter regulator.

3. The starter generator as claimed in claim 1, wherein the connection device comprises a connection element that is electrically connected both to the first electrical line and to the second electrical line and allows, when it is in a first, closed state, an electrical connection to be established between the first electrical line and the second electrical line and, when it is in a second, open state, this electrical connection between the first line and the second line to be removed.

4. The starter generator as claimed in claim 3, wherein the connection device comprises a control means allowing the switching of the connection element between the first, closed state and the second, open state to be controlled, the control means being configured to place the connection element in the first, closed state when the starter generator is operating in starter mode and to place the connection element in the second, open state when the starter generator is operating in generator mode.

5. The starter generator as claimed in claim 1, wherein the connection device comprises a connection element comprising an ohmic conductor that is electrically connected both to the first electrical line and to the second electrical line.

6. The starter generator as claimed in claim 5, wherein the electrical resistance of the ohmic conductor is higher than that of the direct-current stator winding.

7. The starter generator as claimed in claim 1, wherein the connection device comprises a connection element that is connected both to the first electrical line and to the second electrical line, and wherein the connection element is attached to the alternator regulator.

8. The starter generator as claimed in claim 7, comprising a rotary machine comprising the main machine, the exciter and a casing enclosing the main machine and the exciter, said starter generator comprising a regulator assembly comprising the alternator regulator and the connection element, the regulator assembly and the rotary machine forming two objects that are electrically connected or intended to be electrically connected to one another.

9. The starter generator as claimed in claim 7, wherein the alternator regulator comprises a first regulator allowing the supply current and/or voltage of the direct-current stator winding to be regulated, the first regulator comprising power components that are electrically connected to one another by conductive tracks that are formed on a printed circuit board, the connection element being added to the printed circuit board.

10. The starter generator as claimed in claim 7, wherein the connection device comprises a connection element that is connected both to the first electrical line and to the second electrical line, and wherein the alternator regulator comprises a first support and a first regulator that is supplied with direct current and allows the supply current and/or voltage of the direct-current stator winding to be regulated, wherein the first support is a housing accommodating the first regulator and the connection element.

11. The starter generator as claimed in claim 7, wherein the starter regulator comprises a single-phase inverter and a three-phase inverter that are attached to the alternator regulator.

12. The starter generator as claimed in claim 1, comprising a rotary machine comprising the main electric machine and the exciter and a casing accommodating the main electric machine and the exciter, wherein the connection device comprises a connection element that is connected both to the first electrical line and to the second electrical line, the connection element being attached to the casing.

13. The starter generator as claimed in claim 12, wherein the connection element is accommodated in the casing.

14. The starter generator as claimed in claim 12, comprising a transformer assembly comprising the rotary machine and the connection element, the transformer assembly and the alternator regulator forming two objects that are electrically connected or intended to be electrically connected to one another.

15. The starter generator as claimed in claim 12, wherein the electrical resistance of the ohmic conductor is higher than that of the direct-current stator winding, and wherein the alternator regulator is attached to the casing.

16. The starter generator as claimed in claim 14, wherein the connection device comprises a connection element that is connected both to the first electrical line and to the second electrical line, and wherein the connection element is attached to the alternator regulator, and wherein the connection element is attached to the casing via said printed circuit board or the housing.

17. The starter generator as claimed in claim 1, wherein the direct-current stator winding and the alternating-current stator winding are mounted substantially in phase quadrature so as to limit the voltage induced in the direct-current stator winding when the starter generator is operating in starter mode.

\* \* \* \* \*